(No Model.)
J. BIRCH.
BENCH CLAMP.
No. 306,052. Patented Oct. 7, 1884.
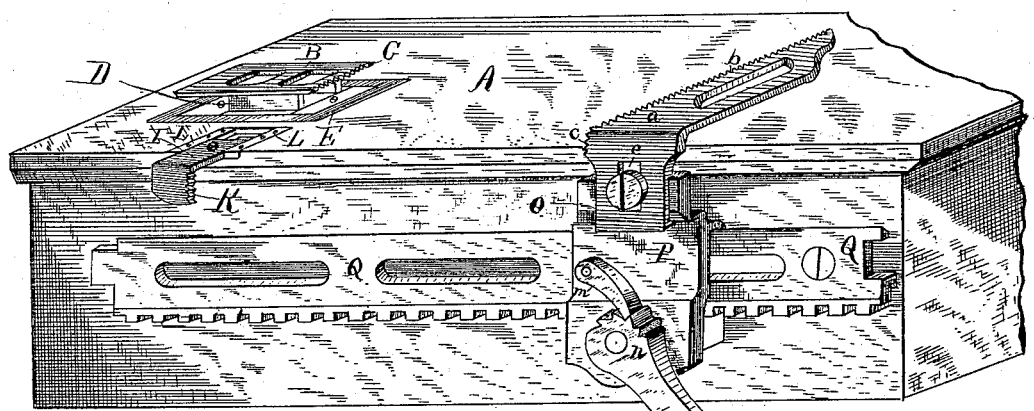
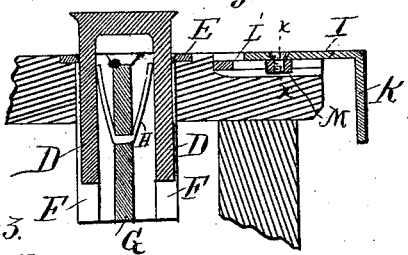
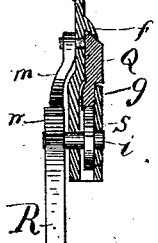
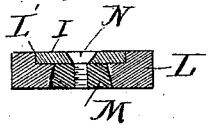
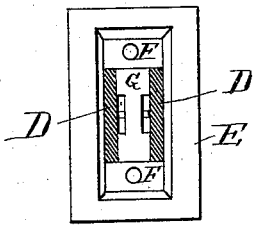
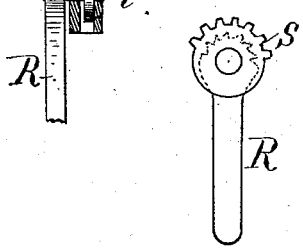
Witnesses
C. W. H. Brown,
H. W. T. Jenner.
Inventor,
John Birch,
By W. A. Bartlett
atty
N. PETERS. Photo-Lithographer, Washington, D. C.

UNITED STATES PATENT OFFICE.

JOHN BIRCH, OF DAYTON, OHIO, ASSIGNOR OF ONE-HALF TO WILLIAM EDWARD SPARKS, OF SAME PLACE.

BENCH-CLAMP.

SPECIFICATION forming part of Letters Patent No. 306,052, dated October 7, 1884.

Application filed August 14, 1884. (No model.)

*To all whom it may concern:*

Be it known that I, JOHN BIRCH, residing at Dayton, in the county of Montgomery and State of Ohio, have invented certain new and useful Improvements in Bench Dogs and Clamps, of which the following is a specification, reference being had therein to the accompanying drawings.

This invention relates to bench-clamps or clamping-dogs; and it consists in the construction and combination of parts, hereinafter pointed out and claimed.

The object of the invention is to produce a clamping device which, when applied to a carpenter's or wood-worker's bench, will enable the workman to secure boards, box-stuff, &c., either on top of the bench or at the side thereof in position for dressing, shaping, mortising, &c.

In the drawings, Figure 1 is a perspective view of part of a bench with my device applied. Fig. 2 is a section through the head stops or dogs. Fig. 3 is a section on line $x\ x$, Fig. 2. Fig. 4 is a section, partly in elevation, of the slide which carries the clamping-arm and its locking mechanism. Fig. 5 is a face view of the mutilated gear and its locking-lever. Fig. 6 is a view, partly in plan and partly in section, of the head-dog.

A is the bench. A vertically-movable dog, B, is placed in usual position on the bench, to serve as a head to the clamp. This dog B has a head, C, as usual, and two standards, D D, extending down into the mortise or slideway in the bench. The frame or setting E, in which the dog B slides, has guide-pieces, F, and a central bar, G. The standards D D move up and down in the guides F and straddle the bar G. A spring, H, (or it may be two springs,) secured to bar G, bears against the inner surface of the standards D D, and by friction holds the dog B in any position to which it may be adjusted. The side dog, I, is arranged on the bench so as to have its teeth in line with the dog B. This dog I has a bent arm, K, which carries the teeth at the side of the bench. The dog I slides in a frame, L, having ways L' for the body of the dog, and a rabbeted or beveled way beneath the same for the reception of the nut M. A screw, N, when tightened in the nut, binds the dog I firmly to the frame L, but by loosening the screw the dog and nut may be moved along the ways to bring the arm K nearer to or farther from the edge of the bench. The two dogs B and I may thus be set to correspond, so as to clasp the work at the same distance from its bearing-surface. In operating on troughs or angular pieces, both dogs will be used at once. The clamping tail-piece O has a bent arm, $a$, provided with teeth $b\ c$ at its front edge, both above and at the side of the bench. This piece $a$ is vertically adjustable on block P, being secured in a guideway in said block by a screw, $d$, passing through a slot, $e$, in the arm. Block P has projections $f\ g$ from its rear face, forming a guide-groove across the rear face of said block. This guide-groove receives the rack-bar Q, which is secured to the side of the bench parallel to the bench top. When block P is applied to the rack-bar, it will slide along said bar and carry arm $a$ with it, so that it will operate as a tail-piece and form the other jaw of a clamp with either the dog B or with both. A mutilated gear, S, is secured to a short axle, $i$, which has bearings in block P, the gear being thus brought beneath rack-bar Q and having for part of its circumference teeth to engage with said rack. A lever, R, serves to rotate or rock said gear, as desired. When the gear is turned so that its mutilated portion comes next the rack-teeth, the block P will be free to slide along said rack; but by turning the teeth on the gear into engagement with the rack no longitudinal movement is permitted, except as controlled by the lever and gear. By means of the lever a very powerful pressure can be applied to move block P and its jaw forward for a short distance. The jaw will thus be able to slide quickly to clamping position and the clamping effected by the lever and gear operating upon the rack.

To prevent a backward movement of the clamping dog or jaw, a pawl, $m$, engages a ratchet, $n$, on the lever R, as clearly shown in Fig. 1.

It is apparent that some deviations may be made from the construction shown without departing from the spirit of my invention. For instance, the position of the clamping screw and slot in the tail-piece O may be reversed, or the adjustability may be effected by mechanism similar to that of the dog I. The rack-teeth on bar Q need not of necessity be at the bottom of said bar. The lever R may be locked by a pin entering holes in the block P, instead of by the ratchet and pawl.

I have illustrated what I believe to be the best means of carrying out my invention; but, except as limited by the claims hereinafter, I do not confine myself to the precise construction described.

The operation of the device will be readily understood from the foregoing description.

I am aware that a bench-clamp having a dog projecting above the bench and mechanism for adjusting the same at the side of the bench has been heretofore described. Such I do not claim, broadly.

What I claim is—

1. The combination of the head-dog B, having standards D D, with frame E, having central bar, G, and a spring bearing frictionally against said standards.

2. The combination, with a work-bench, of the vertically-adjustable dog B on the bench-top, and the laterally-adjustable dog I, projecting at the side of the bench in line with said dog B, substantially as described.

3. The combination, with the bench provided with a fixed guiding-piece, as Q, of the horizontally-sliding block, and lever mechanism by which the same may be forced forward relatively to the fixed piece, the vertically-adjustable slotted bent arm or dog, and its clamping-screw, substantially as described.

4. The combination, with rack-bar fixed to the side of the bench, of the block sliding on said bar, the block having a clamping-dog, and the mutilated gear and its lever, said gear adapted to engage with the rack and force the block and dog forward, substantially as described.

5. The combination, with the bench having a fixed rack, of the movable block carrying an adjustable clamping-dog, the mutilated gear and its lever, and the ratchet on said lever and its engaging-pawl, all arranged for joint operation substantially as described.

In testimony whereof I affix my signature in presence of two witnesses.

JOHN BIRCH.

Witnesses:
ALPHONSO ROSEBOOM,
W. EDWARD SPARKS.